(12) United States Patent
Yadav et al.

(10) Patent No.: US 10,496,497 B1
(45) Date of Patent: Dec. 3, 2019

(54) LIVE OBJECT LEVEL INTER PROCESS COMMUNICATION IN FEDERATED BACKUP ENVIRONMENT

(71) Applicant: EMC IP Holding Company LLC, Hopkinton, MA (US)

(72) Inventors: Sunil Yadav, Bangalore (IN); Soumen Acharya, Bangalore (IN); Anupam Chakraborty, Bangalore (IN); Tushar Dethe, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 248 days.

(21) Appl. No.: 15/377,332

(22) Filed: Dec. 13, 2016

(51) Int. Cl.
　　*G06F 11/14* 　　(2006.01)
　　*H04L 29/08* 　　(2006.01)
　　*G06F 11/20* 　　(2006.01)

(52) U.S. Cl.
　　CPC ...... *G06F 11/1469* (2013.01); *G06F 11/1451* (2013.01); *G06F 11/1464* (2013.01); *G06F 11/2064* (2013.01); *H04L 67/1095* (2013.01); *H04L 67/1097* (2013.01); *H04L 67/18* (2013.01)

(58) Field of Classification Search
　　CPC . H04L 67/1095; H04L 67/1097; H04L 67/18; G06F 11/1469; G06F 11/2064; G06F 11/1464; G06F 11/1451
　　See application file for complete search history.

(56) References Cited

U.S. PATENT DOCUMENTS

| | | | | |
|---|---|---|---|---|
| 9,398,092 | B1* | 7/2016 | Singhal | H04L 67/1097 |
| 9,665,445 | B1* | 5/2017 | Acharya | G06F 11/1464 |
| 9,753,810 | B1* | 9/2017 | Khandelwal | H04L 67/1002 |
| 10,055,309 | B1* | 8/2018 | Samad | G06F 11/1464 |
| 2010/0070726 | A1* | 3/2010 | Ngo | G06F 11/1469 |
| | | | | 711/162 |
| 2012/0278287 | A1* | 11/2012 | Wilk | G06F 11/1464 |
| | | | | 707/654 |
| 2012/0311572 | A1* | 12/2012 | Falls | G06F 9/455 |
| | | | | 718/1 |
| 2014/0052692 | A1* | 2/2014 | Zhang | G06F 11/1464 |
| | | | | 707/639 |
| 2015/0370652 | A1* | 12/2015 | He | G06F 11/1451 |
| | | | | 714/19 |

* cited by examiner

*Primary Examiner* — Ramy M Osman
(74) *Attorney, Agent, or Firm* — Womble Bond Dickinson (US) LLP (57) ABSTRACT

In one embodiment, a sender process on a node of a node cluster communicates a live object to a receiver process. The sender process determines a shared binary file and a shared file location. The sender process serializes the live object to be communicated to a receiver process, into a binary data stream and writes the binary data stream into the predetermined shared binary file. The receiver process receives a shared binary filename and the shared location associated with the shared binary file. The receiver process de-serializes the binary data stream and reconstructs the live object. The communication is independent of the type of proxy, i.e., virtual or physical, and operating systems of the proxies, such as Windows, Mac OS, or Linux. The live objects may be VM configurations and VHD information metadata.

18 Claims, 8 Drawing Sheets

LIVE OBJECT LEVEL INTER PROCESS COMMUNICATION IN FEDERATED BACKUP ENVIRONMENT

FIELD OF THE INVENTION

Embodiments of the present invention relate generally to data storage systems. More particularly, embodiments of the invention relate to inter process communication of live objects in a federated backup environment to enable parallel data rollover by dedicated backup proxies (virtual machines) running in the federated backup environment.

BACKGROUND

A federated backup environment is an environment in which back up of data is distributed among multiple nodes in a cluster and/or virtual machines running on a hypervisor cluster. Such a federated backup environment typically has data stored on a cluster shared volume (CSV) accessible by all nodes of the cluster for read and writes. Furthermore, each of the virtual machines (or virtual proxies) or physical nodes in the cluster is not restricted to any particular operating system, such as Windows, Linux, Unix, or a mix of them.

A need had arisen to transfer live objects (objects created in a process which has not been destroyed) from one process to another among a node cluster to facilitate parallel backup operations. The transfer of live objects from one process to another process on a cluster should not be restricted to the operating environment or physical location of a node in a federated backup environment to help customers to use virtual machines from any operating systems or vendors for data rollover operation.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. A Cluster Shared Volume (CSV) is a shared disk containing an NT file system (NTFS) or Resilient File System (ReFS) (ReFS: Windows Server 2012 R2 or newer) volume that is made accessible for read and write operations by all nodes within a Windows Server Failover Cluster. A CSV provides simultaneous read-write access to a shared volume by all nodes of the cluster. A "federated backup environment" is an environment in which back up of data is distributed among multiple nodes in a cluster and/or virtual machines running on a hypervisor cluster. A "live" object refers to data object which is created in a process and has not been destroyed. A proxy refers to a computer or a software system running on a computer that acts as an intermediary between an endpoint device, such as a computer, and another server from which a user or client is requesting a service. A virtual proxy refers to a virtual machine.

According to some embodiment, a snapshot module (e.g., a sender process) of a physical node in a node cluster transports live objects to one or more rollover modules (e.g., receiver process) of a plurality of virtual machines in the node cluster (or hypervisor cluster). The sender process determines a shared binary file and a shared file location. The sender process serializes a live object to be communicated to a receiver process, into a binary data stream and writes the binary data stream into the predetermined shared binary file. The receiver process receives a shared binary filename and the shared location associated with the shared binary file. The receiver process de-serializes the binary data stream and reconstructs the live object. The first node is different from the second node but both the first and the second nodes are on the same node cluster. The communication is independent of the type of proxy, i.e., virtual or physical, and the operating systems running on the proxies, such as Windows, Mac OS, or Linux. The live object may be information that enables a parallel data rollover (or backup rollover) by backup proxies, such as a data object of VM configurations and VHD information metadata.

According to some embodiment, a snapshot module (e.g., a sender process) of a physical node in a node cluster transports live objects to one or more rollover modules (e.g., receiver process) of a plurality of virtual machines in the node cluster (or hypervisor cluster). The snapshot module serializes a list of one or more live objects into a stream of binary data in the order according to occurrence of the one or more live objects in the list, e.g., first in first out (FIFO) or alphabetical. The stream of binary data is written to a shared binary file on a shared location accessible by all nodes and/or virtual machines (VMs) of the node cluster. The shared binary file is saved with a filename according to a naming convention or the name may be generated by a random name generator and the file name and shared location is broadcasted to one or more rollover modules of one or more virtual machines in the hypervisor cluster. The one or more rollover modules of the one or more virtual machines de-serialize the binary file and recreate the list of one or more live objects. The one or more rollover modules of the one or more virtual machines perform a rollover operation in parallel based on the one or more live objects. The live object may be information that enables a parallel data rollover by backup proxies, such as a data object of VM configurations and VHD information metadata.

In one embodiment, a snapshot module of a node in a node cluster initializes a backup process. The snapshot module performs a snapshot process to collect virtual machine configurations of each of the virtual machines, and virtual hard disk (VHD) information of the virtual machines of the hypervisor cluster. The snapshot module saves the collected configuration information on a shared binary file in a shared location. The snapshot module determines a list of one or more virtual machines from the virtual machines in the hypervisor cluster to perform a rollover process. The snapshot module sends a federated job or commands to the one or more virtual machines with information about the shared binary file to allow the one or more virtual machines to perform a backup rollover process in parallel. The rollover process may include a sending of storage volume snapshot metadata, the VM configurations, and VHD information to a backup system.

Figure 1:
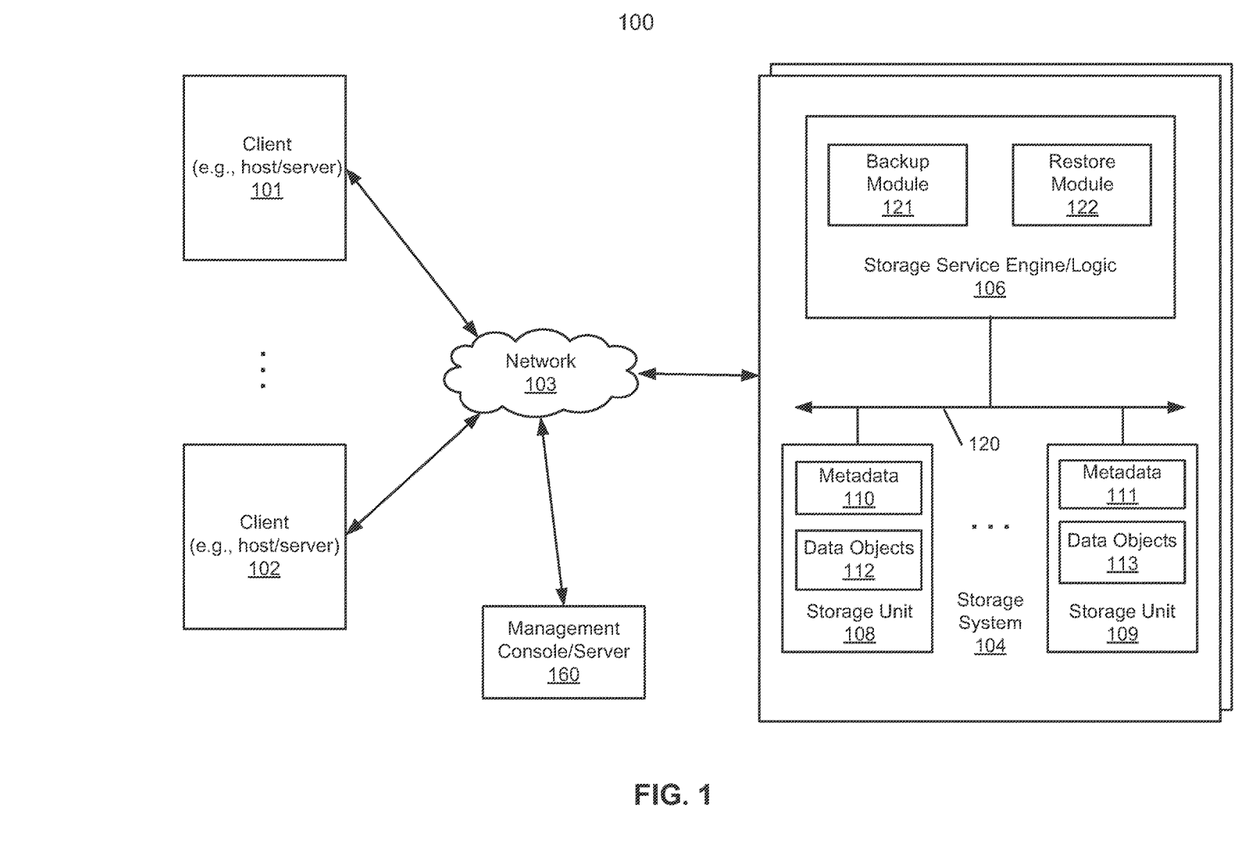
FIG. 1 is a block diagram illustrating a storage system according to one embodiment of the invention.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), and one or more storage units or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include backup logic 121 and restore logic 122. Backup logic 121 is configured to receive and back up data from a client (e.g., clients 101-102) and to store the backup data in any one or more of storage units 108-109. Restore logic 122 is configured to retrieve and restore backup data from any one or more of storage units 108-109 back to a client (e.g., clients 101-102).

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In some embodiments, metadata 110-111, may be stored in at least some of storage units 108-109, such that files can be accessed independent of another storage unit. Metadata of each storage unit includes enough information to provide access to the files it contains. The metadata may include fingerprints contained within data objects 112-113, where a data object may represent a live object or a list of live objects of virtual machine configurations and virtual hard disk information. Fingerprints are mapped to a particular data object via metadata 110-111, which enable the system to identify the location of the data object containing a chunk represented by a particular fingerprint.

In one embodiment, storage system 104 further includes a storage manager or storage controller (not shown) configured to manage storage resources of storage system 104, such as, for example, storage space and processing resources (e.g., processor, memory, network resources). The storage manager or controller may be accessed by an administrator of management console or server 160 remotely via a management or configuration interface (not shown). The administrator can provision and manage storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines (e.g., virtual storage systems) managed by one or more virtual machine managers (VMMs). Each of the virtual machines can be provisioned to provide a particular type of storage services (e.g., file-based, block-based, object-based, or HDFS) to a client based on a storage policy or service level agreement associated with that particular client as part of software-defined storage services.

Figure 2A:
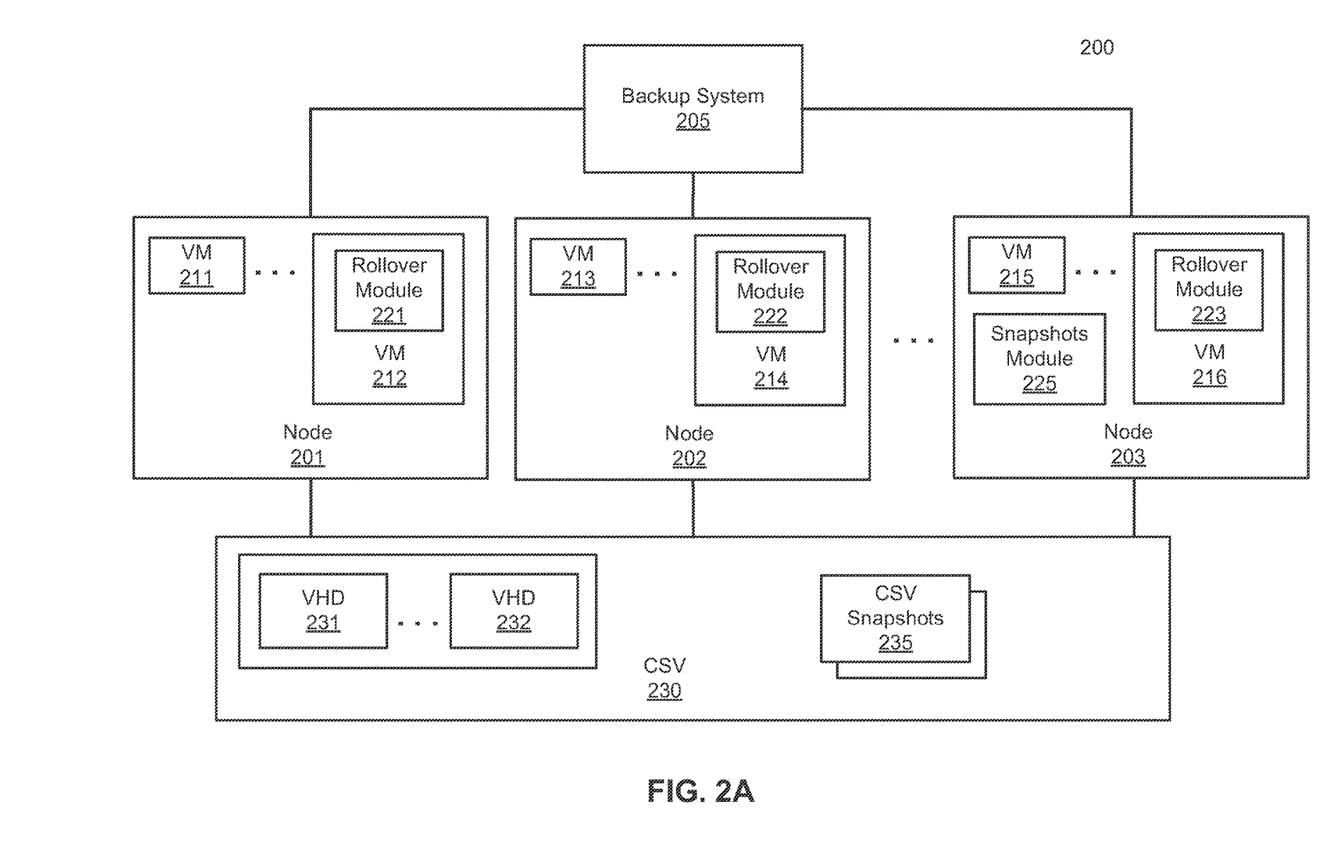
FIGS. 2A-2B are block diagrams illustrating a federated backup environment according to one embodiment of the invention.

FIG. 2A is a block diagram illustrating a federated backup environment according to one embodiment of the invention. Node 201, 202 may be representative of client 101, 102 of FIG. 1, respectively, and backup system 205 may be representative of storage system 104 of FIG. 1. Virtual hard disk (VHD) 231, 232, and CSV snapshots 235 in the cluster storage volume (CSV) 230 may be remote or local, and may be managed by management console/server 160 of FIG. 1.

Although only three nodes, node 201, 202, and 203, are shown in FIG. 2A, the federated backup environment or cluster 200 may include 64, 128, or any number of nodes supported by a federated backup environment. Similarly, node 201 is showed to include VM 211 and 212, however, node 201, and similar nodes, may include any number of virtual machines or VMs supported by a federated backup environment. Each node within cluster 200 may access CSV 230 for read and write operations. Furthermore, VMs can migrate from one node to another, such that VMs have complete mobility throughout the cluster as any node can be the VM owner, and the VMs can failover from one node to another seamlessly. Cluster 200 may deploy the VMs, storage resources and services by a Microsoft virtual machine manager (VMM) or any other type of VMM. VM 211, and similar VMs, may run on any operating systems, such as Windows, Mac OS, Linux, or Unix.

Referring to FIG. 2A, Node 203 contains a Snapshot Module 225. Snapshot Module 225 performs a snapshot process, i.e., to make a photocopy of the cluster shared volume or CSV for a consistent point in time, to generate CSV Snapshots 235, and collects VM configurations metadata for all VMs residing on cluster 200 and VHD information metadata with respect to the VMs. Examples of VM configurations metadata may include metadata of network and DVD configurations of a respective VM. VM configuration metadata may further contain file path of VHDs, path of check-point files. VHD information metadata may include VHD controller metadata, VHD type metadata, and VHD size metadata, of a respective VM. VHD controller metadata describes the VHD controller, i.e., small computer system interface (SCSI), or Integrated Drive Electronics (IDE) disk. Examples of VHD type metadata includes fixed, dynamically expanding, or differencing VHD. Example of VHD size metadata may be 1.0 terabyte. Snapshot module 225 serializes the collected VM configurations and VHD information metadata, or live objects, and writes the serialized binary data into a binary file on a shared location accessible by all nodes and/or VMs of cluster 200. The shared binary file filename may be predetermined or randomly generated by a random filename generated. The shared location may be predetermined or the shared location folder may be created on runtime by snapshot module 225. Once a binary shared file is created, snapshot module 225 or node 201 may call a federated job or a command line subroutine, with information about the shared binary file as input parameters, to start child processes for a parallel backup rollover operation.

Referring to FIG. 2A, a rollover process may be performed by rollover modules 221, 222, 225 of VMs 212, 214, 216 respectively. Although this example embodiment of FIG. 2A shows three rollover modules on three VMs respectively, a federated backup environment or cluster 200 may include any number of rollover modules/VMs. Rollover module 221-223 each receives the federated job or command line call from snapshot module 225. Rollover module 221-223 each retrieves the shared binary file and de-serializes the serialized binary data to reconstruct the live objects, or VM configurations and VHD information metadata representative of all the VMs of cluster 200. Rollover module 221, 222, 223 processes the live objects to determine which live objects metadata and/or portions of CSV snapshots 235 to backup, and where it should backup to. VM 212, 214, 216 may be grouped to use a load balancer such that rollover modules 221-223 may rollover, or send, in parallel, the live object and CSV snapshots 235 metadata to backup system 205 for a high throughput. Each of the rollover modules 221-223 may send a separate one of the objects or a segment of an object in a distributed manner.

Figure 2B:
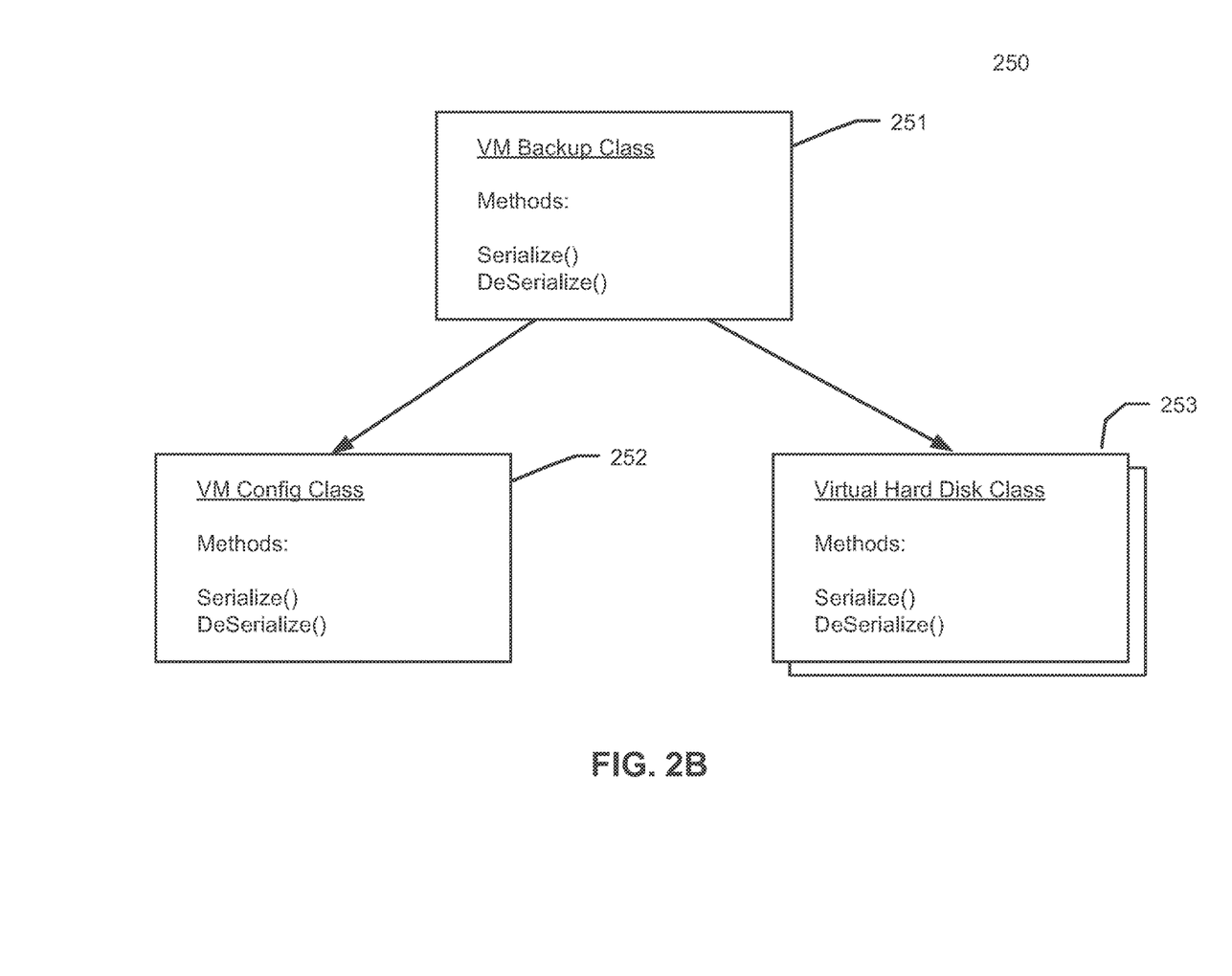

FIG. 2B is an object diagram illustrating a live object, according to one embodiment of the invention. Live object 250 includes a VM backup class object 250. VM backup class object 250 implements a serialize and a de-serialize subroutine. VM backup class object 250 contains VM configuration class object 252 and one or more virtual hard disk class objects 253 each implementing a serialize and a de-serialize subroutine. For example, a call to the serialize subroutine of VM backup class object 250 may call the serialize subroutine of VM config class 252 and one or more serialize subroutines of the one or more hard disk objects 253, respectively. The serialize subroutine of VM config class 252 may collect and serialize live objects of VM configuration, such as DVD and network configurations, into binary data. The serialize subroutines of VHD class 253 may collect and serialize live objects of VHD information of the one or more VMs, respectively, into binary data. The serialize subroutines of VM config class 252 and VHD class 253 may pass the serialized binary data as return value to serialize subroutine of VM backup class 251. Serialize subroutine of VM backup class 251 may then return a binary data, representative of the VM backup class object 251, to a caller processor. The VHD class 253 binary data may be ordered according to its occurrence, such an example ordering may be alphabetical. The binary data representative of VM backup class object 251 may then be exchanged or communicated to other processors in a federated backup environment.

Figure 3:
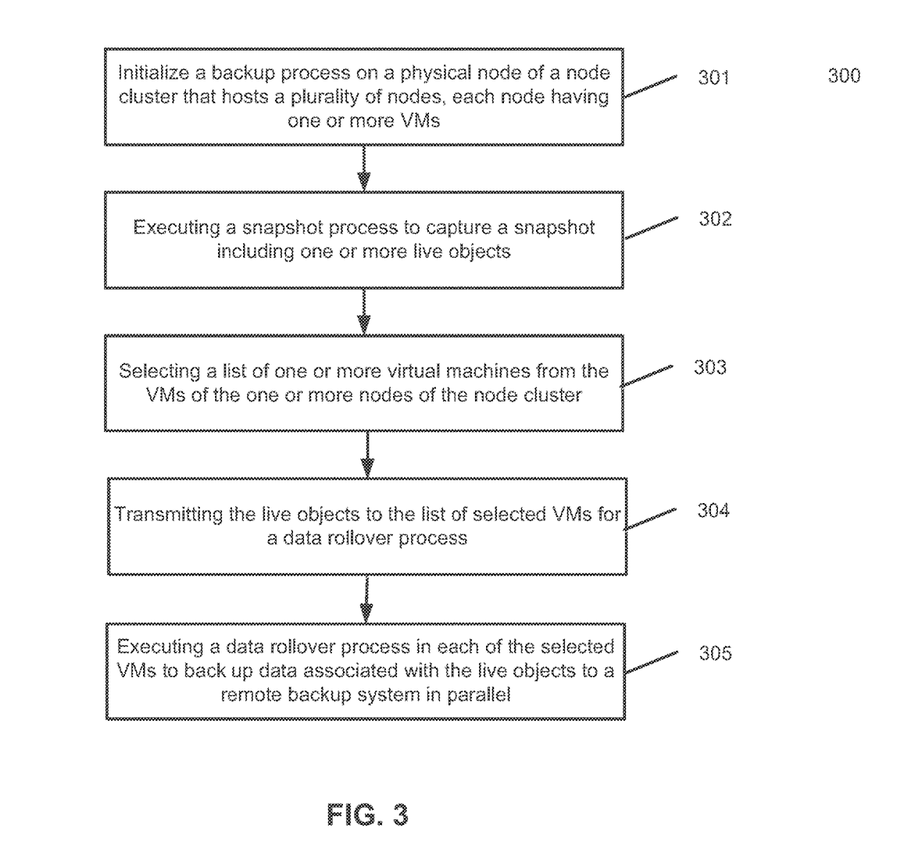
FIG. 3 is a flowchart illustrating an example method for backing up data by a parallel rollover process according to one embodiment of the invention.

FIG. 3 is a flow diagram illustrating a process to use multiple virtual proxies (i.e., VMs) in a federated backup environment to send data to a backup storage, according to one embodiment of the invention. Process 300 may be performed by processing logic that includes hardware (e.g. circuitry, dedicated logic, etc.), software (e.g., embodied on a non-transitory computer readable medium), or a combination thereof. For example, process 300 may be performed by node 201 or snapshot module 225 of node 201 of FIG. 2A. Referring to FIG. 3, at block 301, processing logic initializes a backup process on a physical node of a node cluster, such that the node cluster includes a plurality of nodes, each node having one or more VMs. At block 302, processing logic executes a snapshot process to capture a snapshot including one or more live objects, such that the live objects comprises VM configurations and virtual hard disk (VHD) information of one or more VHDs, wherein the snapshot represents a consistent point of the node cluster. At block 303, processing logic selects a list of one or more virtual machines from the VMs of the one or more nodes of the node cluster. At block 304, processing logic transmits the live objects to the list of selected VMs for a data rollover process. At block 305, processing logic executes a data rollover process in each of the selected VMs to back up data associated with the live objects to a remote backup system in parallel.

In one embodiment, at least two of the selected virtual machines for the data rollover process are hosted in different nodes of the node cluster. In another embodiment, the snapshot process and the data rollover process is hosted on the same node of the node cluster.

In one embodiment, the snapshot process serializes the live objects into one or more streams of one or more serialized objects, wherein the stream of serialized objects are transmitted from the snapshot process to a data rollover process of each of the selected VMs. In another embodiment, the snapshot process is executed within a host operating system (OS) and each of the rollover processes is executed within a guest OS running in each of the selected VMs. In another embodiment, at least one of the guest OSs of the selected VMs is different than the host OS.

In one embodiment, for each of the serialized objects received at a VM from the snapshot process, a rollover process is executed within the VM deserializing a serialized object to recover a corresponding live object, such that the recovered live object is backed up to a remote backup system. In another embodiment, each of the live object to be backed up is a class object such that the class of the live object implements a serialize function and a deserialize function as function members of the corresponding live object, such that serializing and deserializing are performed by calling the corresponding serialize and deserialize function respectively. Since a host OS and a guest OS may be different, a conventional inter-process communication may not work because they are related to different platforms. By serializing the objects into a binary file, the binary file can be communicated across different platforms more efficiently. A rollover process can simply process the deserialization of the objects without having to worry about the specific platform related features or characteristics of the objects.

Figure 4:
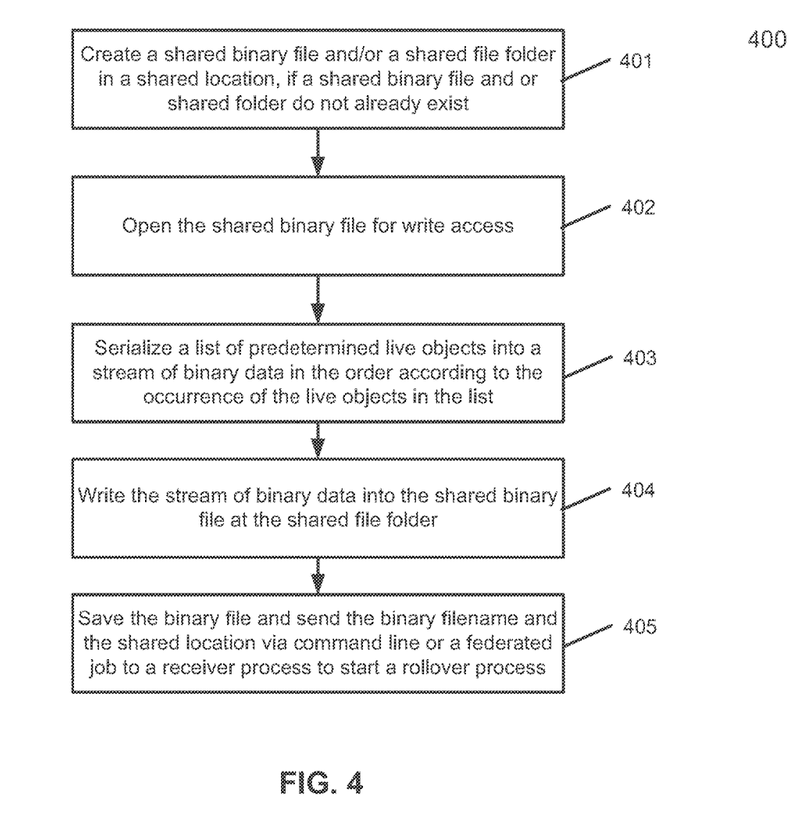
FIG. 4 is a flowchart illustrating an example method for a snapshot process performed by a snapshot module according to one embodiment of the invention.

FIG. 4 is a flow diagram illustrating a sender process 400 creating a shared binary file in a shared location, according to one embodiment of the invention. Sender process 400 may be performed by processing logic that includes hardware (e.g. circuitry, dedicated logic, etc.), software (e.g., embodied on a non-transitory computer readable medium), or a combination thereof. For example, process 400 may be performed by snapshot module 225 of FIG. 2A. Referring to FIG. 4, at block 401, processing logic creates a shared binary file and/or a shared file folder in a shared location, if a shared binary file and/or shared file folder do not already exist. At block 402, processing logic opens the shared binary file for write access. At block 403, processing logic serializes a list of predetermined live objects, i.e., VM configurations and VHD information, into a stream of binary data according to its occurrence in the list. The ordering or occurrence may be any ordering such as alphabetical or FIFO. At block 404, processing logic writes the stream of binary data into the shared binary file at the shared file folder. At block 405, processing logic saves the binary file and sends the binary filename and the shared location via command line or a federated job to a receiver process, such as a receiver process of FIG. 5, to start a rollover process.

Figure 5:
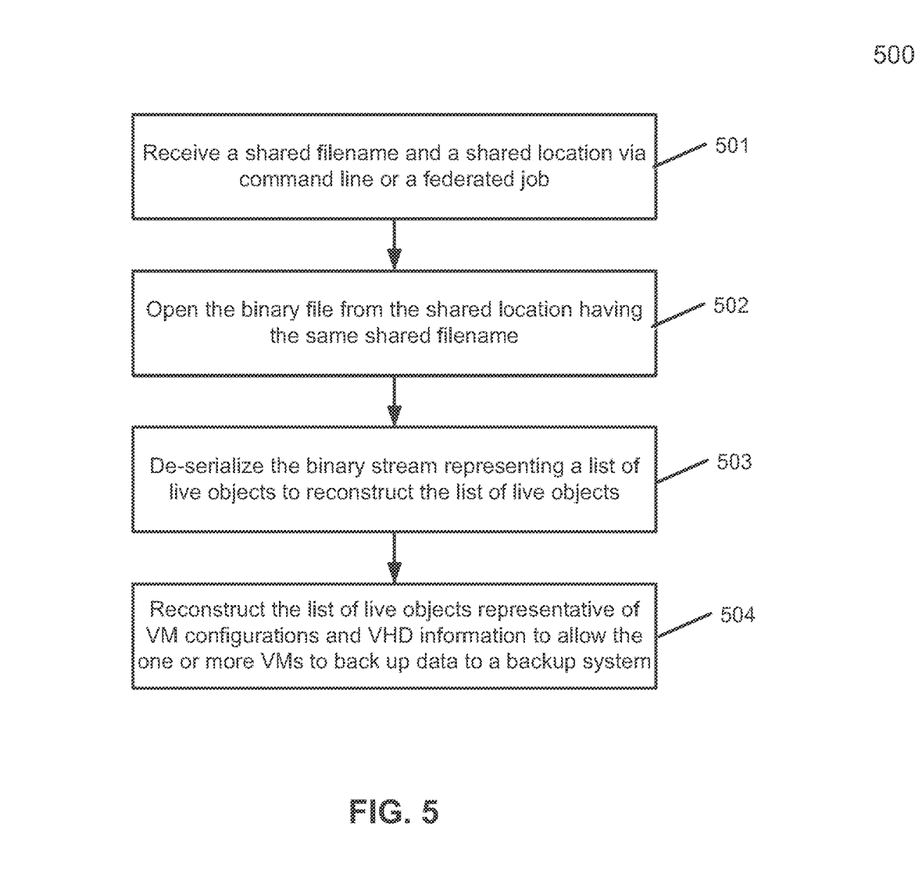
FIG. 5 is a flowchart illustrating an example method for serializing VM configurations and VHD information in a snapshot process according to one embodiment of the invention

FIG. 5 is a flow diagram illustrating a receiver process 500 receiving a shared binary file and a shared location, according to one embodiment of the invention. Receiver process 500 may be performed by processing logic that includes hardware (e.g. circuitry, dedicated logic, etc.), software (e.g., embodied on a non-transitory computer readable medium), or a combination thereof. For example, process 500 may be performed by rollover module 221, 222, 223 of FIG. 2A. Referring to FIG. 5, at block 501, processing logic receive a shared filename and a shared location via command line or a federated job. At block 502, processing logic opens the shared binary file from the shared location. At block 503, processing logic, de-serializes the binary data stream representing a list of live objects to reconstruct the list of live objects. At block 504, processing logic reconstructs the list of live objects representing the VM configurations and VHD information to allow the one or more VMs to back up data to a backup system.

Figure 6:
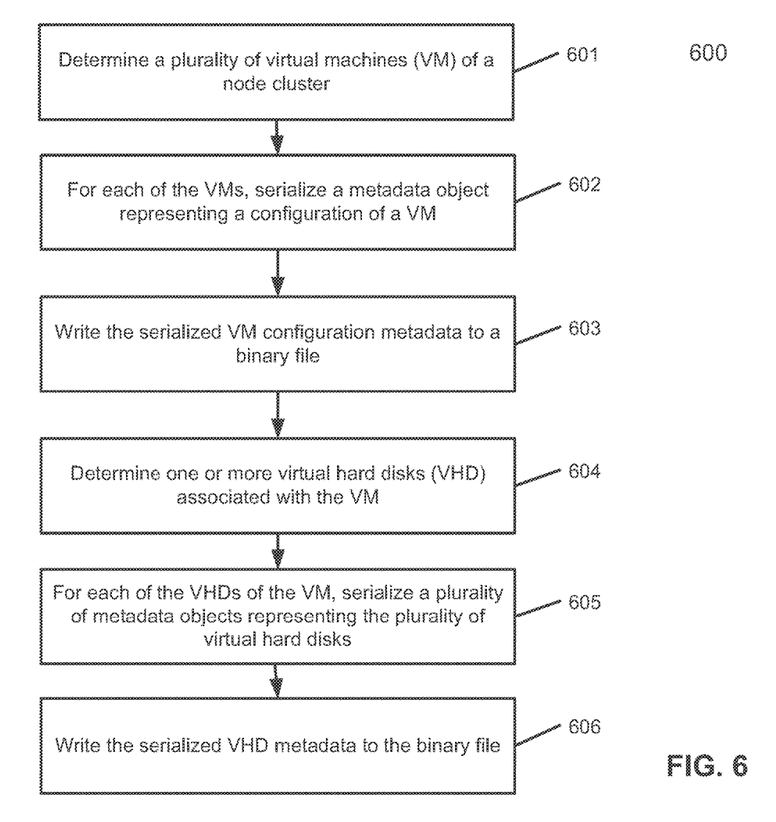
FIG. 6 is a flowchart illustrating an example method for de-serializing VM configurations and VHD information performed by a rollover module according to one embodiment of the invention

FIG. 6 is a flow diagram illustrating a serialize process 600 that serializes an object of backup VM class 251 of FIG. 2B, according to one embodiment of the invention. Serialize process 600 may be performed by processing logic that includes hardware (e.g. circuitry, dedicated logic, etc.), software (e.g., embodied on a non-transitory computer readable medium), or a combination thereof. For example, serialize process 600 may be performed by node 201 or snapshot module 225 of FIG. 2A. Referring to FIG. 6, at block 601, processing logic determines a plurality of VMs of the cluster. At block 602, for each of the VMs, processing logic serializes a VM configuration metadata object. At block 603, processing logic writes the serialized configuration metadata objects to a shared binary file. At block 604, processing logic determines one or more VHDs associated with each of the VMs. At block 605, for each of the VHDs associated with each of the VMs, process logic serializes the VHD information metadata objects. At block 606, processing logic writes the serialized VHD metadata objects to the shared binary file.

By using the above live object communication for Windows Hyper-V cluster protection, multiple Windows or Linux VMs or a mix of them can be used to send data to backup storage system in parallel. This helps customers or vendors to utilize VMs from any operating systems to perform a data rollover operation. Note that the communication of live objects as described above is not limited to a federated backup environment but may be implemented on a server-client workflow, or a client to client workflow.

Note that some or all of the components as shown and described above (e.g., snapshot module 225 of FIG. 2) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 7:
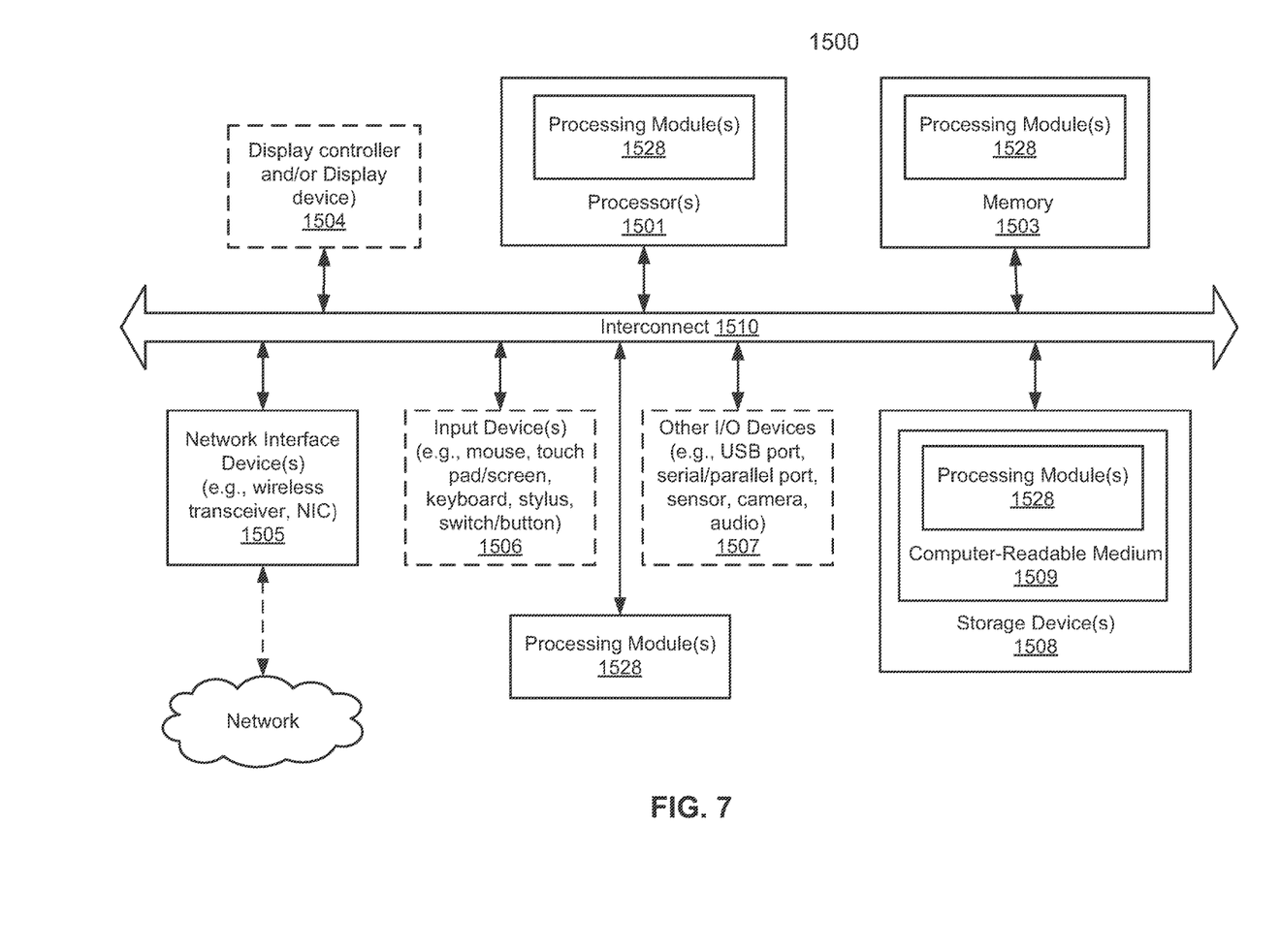
FIG. 7 is a block diagram illustrating a data processing system according to one embodiment.

FIG. 7 is a block diagram illustrating an example of a data processing system which may be used with one embodiment of the invention. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, snapshot module 225, or rollover module 221, 222, and 223 as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method to back up data in parallel by virtual machines (VM) in a federated backup environment, the method comprising:

initializing a backup process on a physical node of a node cluster, wherein the node cluster includes a plurality of physical nodes, each physical node having one or more VMs;

executing a snapshot process to capture a snapshot including one or more live objects, wherein the live objects comprise VM configurations and virtual hard disk (VHD) information of one or more VHDs, wherein the snapshot represents a consistent point of the node cluster;

selecting a list of VMs from the VMs of the plurality of physical nodes of the node cluster;

transmitting the live objects to the list of selected VMs for a data rollover process;

executing a data rollover process in each of the selected VMs to back up data associated with the live objects to a remote backup system in parallel;

serializing by the snapshot process the live objects into one or more streams of one or more serialized objects, wherein the streams of serialized objects are transmitted from the snapshot process to the data rollover process of each selected VM;

for each of the one or more serialized objects received at a VM from the snapshot process, executing a rollover process within the VM to deserialize the serialized object to recover a corresponding live object, and backing up the recovered live object to the remote backup system.

2. The method of claim 1, wherein at least two of the selected virtual machines are hosted in different nodes of the node cluster.

3. The method of claim 1, wherein the snapshot process is executed within a host operating system (OS) and each of the rollover processes is executed within a guest OS running in each of the selected VMs.

4. The method of claim 3, wherein at least one of the guest operating systems of the selected VMs is different than the host OS.

5. The method of claim 1, wherein the live object to be backed up includes a serialize function and a deserialize function as function members of the corresponding live object, and wherein serializing and deserializing are performed by calling the corresponding serialize function and deserialize function respectively.

6. The method of claim 1, wherein the one or more streams of one or more serialized objects are written to a shared binary file on a shared location accessible by a plurality of nodes and VMs.

7. A non-transitory machine-readable medium having instructions stored therein, which when executed by a processor, cause the processor to perform operations to back up data in parallel by virtual machines (VM) in a federated backup environment, the operations comprising:

initializing a backup process on a physical node of a node cluster, wherein the node cluster includes a plurality of physical nodes, each physical node having one or more VMs;

executing a snapshot process to capture a snapshot including one or more live objects, wherein the live objects comprise VM configurations and virtual hard disk (VHD) information of one or more VHDs, wherein the snapshot represents a consistent point of the node cluster;

selecting a list of VMs from the VMs of the plurality of physical nodes of the node cluster;

transmitting the live objects to the list of selected VMs for a data rollover process;

executing a data rollover process in each of the selected VMs to back up data associated with the live objects to a remote backup system in parallel;

serializing by the snapshot process the live objects into one or more streams of one or more serialized objects, wherein the streams of serialized objects are transmitted from the snapshot process to the data rollover process of each selected VM; and for each of the one or more serialized objects received at a VM from the snapshot process, executing a rollover process within the VM to deserialize the serialized object to recover a corresponding live object, and backing up the recovered live object to the remote backup system.

8. The machine-readable medium of claim 7, wherein at least two of the selected virtual machines are hosted in different nodes of the node cluster.

9. The machine-readable medium of claim 7, wherein the snapshot process is executed within a host operating system (OS) and each of the rollover processes is executed within a guest OS running in each of the selected VMs.

10. The machine-readable medium of claim 9, wherein at least one of the guest operating systems of the selected VMs is different than the host OS.

11. The machine-readable medium of claim 1, wherein the live object to be backed up includes a serialize function and a deserialize function as function members of the corresponding live object, and wherein serializing and deserializing are performed by calling the corresponding serialize function and deserialize function respectively.

12. The machine-readable medium of claim 7, wherein the one or more streams of one or more serialized objects are written to a shared binary file on a shared location accessible by a plurality of nodes and VMs.

13. A data processing system, comprising:

a processor; and a memory coupled to the processor to store instructions, which when executed by the processor, cause the processor to perform operations, the operations including initializing a backup process on a physical node of a node cluster, wherein the node cluster includes a plurality of physical nodes, each physical node having one or more VMs, executing a snapshot process to capture a snapshot including one or more live objects, wherein the live objects comprise VM configurations and virtual hard disk (VHD) information of one or more VHDs, wherein the snapshot represents a consistent point of the node cluster, selecting a list of VMs from the VMs of the plurality of physical nodes of the node cluster, transmitting the live objects to the list of selected VMs for a data rollover process, executing a data rollover process in each of the selected VMs to back up data associated with the live objects to a remote backup system in parallel, serializing by the snapshot process the live objects into one or more streams of one or more serialized objects, wherein the streams of serialized objects are transmitted from the snapshot process to the data rollover process of each selected VM, for each of the one or more serialized objects received at a VM from the snapshot process, executing a rollover process within the VM to deserialize the serialized object to recover a corresponding live object, and backing up the recovered live object to the remote backup system.

14. The system of claim 13, wherein at least two of the selected virtual machines are hosted in different nodes of the node cluster.

15. The system of claim 13, wherein the snapshot process is executed within a host operating system (OS) and each of the rollover processes is executed within a guest OS running in each of the selected VMs.

16. The system of claim 15, wherein at least one of the guest operating systems of the selected VMs is different than the host OS.

17. The system of claim 13, wherein the live object to be backed up includes a serialize function and a deserialize function as function members of the corresponding live object, and wherein serializing and deserializing are performed by calling the corresponding serialize function and deserialize function respectively.

18. The system of claim 13, wherein the one or more streams of one or more serialized objects are written to a shared binary file on a shared location accessible by a plurality of nodes and VMs.

* * * * *